United States Patent
Rached et al.

(10) Patent No.: US 6,671,313 B1
(45) Date of Patent: Dec. 30, 2003

(54) TIME-WEIGHTED TRANSMISSION CHANNEL ESTIMATION

(75) Inventors: Nidham Ben Rached, Paris (FR); Jean-Louis Dornstetter, Plaisir (FR)

(73) Assignee: Nortel Matra Cellular, Guyancourt (FR)

( * ) Notice: Subject to any disclaimer, the term of this patent is extended or adjusted under 35 U.S.C. 154(b) by 0 days.

(21) Appl. No.: 09/402,956

(22) PCT Filed: Apr. 10, 1998

(86) PCT No.: PCT/FR98/00734

§ 371 (c)(1), (2), (4) Date: Feb. 14, 2000

(87) PCT Pub. No.: WO98/47239

PCT Pub. Date: Oct. 22, 1998

(30) Foreign Application Priority Data

Apr. 14, 1997 (FR) .............................................. 97 04933

(51) Int. Cl.[7] .............................. H04B 3/46; H04L 1/00
(52) U.S. Cl. ........................................ 375/224; 375/232
(58) Field of Search ................................ 375/148, 349, 375/232, 243, 354, 344; 370/335, 337, 465; 363/131; 455/54–115, 456

(56) References Cited

U.S. PATENT DOCUMENTS

| | | | | |
|---|---|---|---|---|
| 5,432,816 A | * | 7/1995 | Gozzo | 363/131 |
| 5,471,501 A | * | 11/1995 | Parr et al. | 375/232 |
| 5,479,446 A | * | 12/1995 | Mourot | 375/243 |
| 5,513,221 A | * | 4/1996 | Parr et al. | 375/232 |
| 5,606,580 A | * | 2/1997 | Mourot et al. | 370/465 |
| 5,822,315 A | * | 10/1998 | de Seze et al. | 370/337 |
| 6,101,399 A | * | 8/2000 | Raleigh et al. | 342/367 |

* cited by examiner

Primary Examiner—Stephen Chin
Assistant Examiner—Lawrence Williams
(74) Attorney, Agent, or Firm—Barnes & Thornburg

(57) ABSTRACT

The invention relates to a method of estimating a transmission channel from a signal (S) received by that channel. The received signal corresponds to a transmitted training sequence, and the method includes the following steps: acquiring a statistic of the transmission channel, establishing an estimate (Xp) of the impulse response of the channel weighted by the statistic of the channel of the received signal (S).

8 Claims, 2 Drawing Sheets

TIME-WEIGHTED TRANSMISSION CHANNEL ESTIMATION

Figure 1:
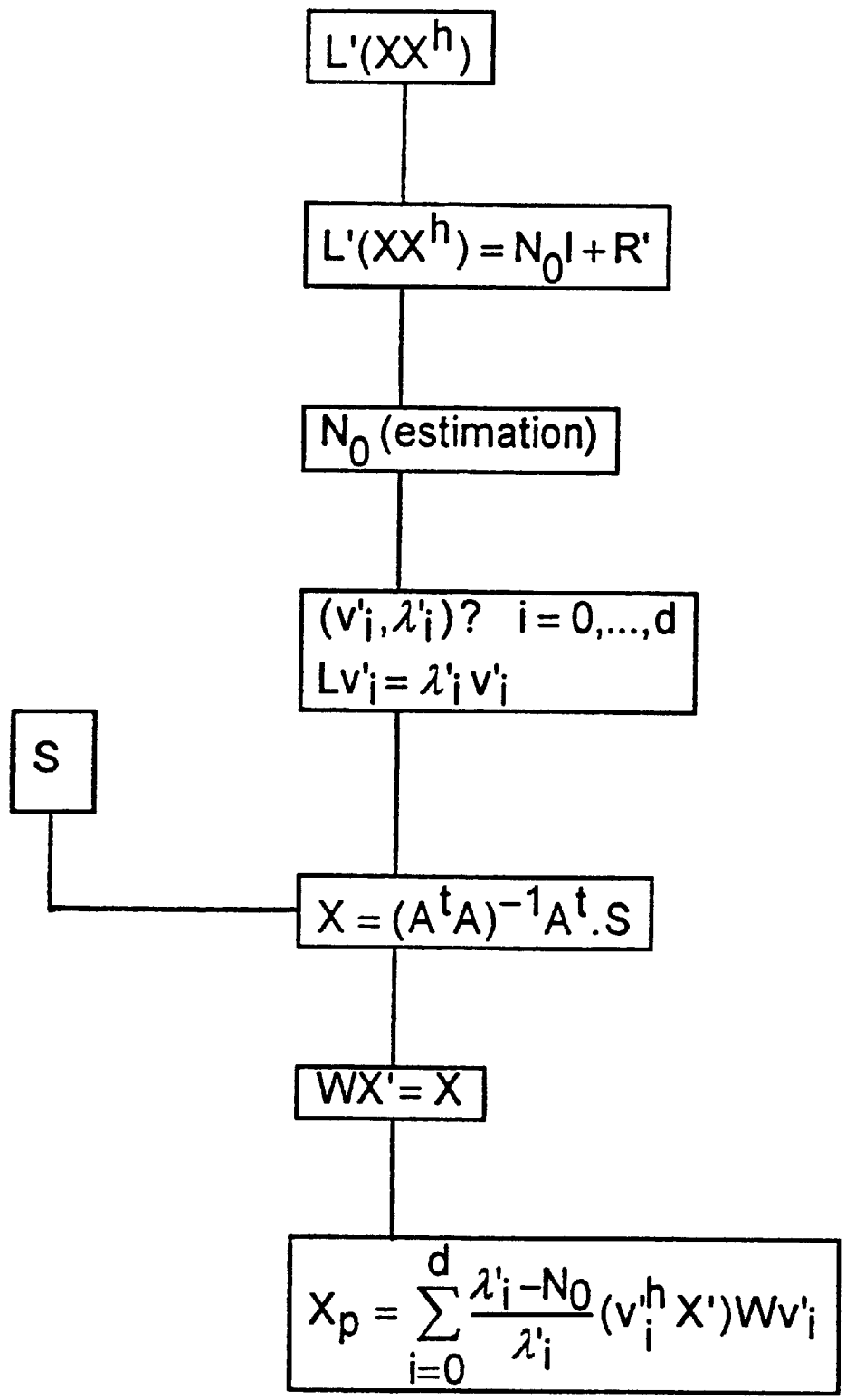

The present invention relates to a method of estimating a transmission channel. In other words, the invention proposes a method of estimating the impulse response of a transmission channel.

In a communications system, especially a radio communications system, a transmitter transmits a signal to a receiver via a transmission channel. The transmitted signal is subject to amplitude and phase fluctuations in the transmission channel, with the result that the signal received by the receiver is not identical to the transmitted signal. The signal fluctuations are essentially due to what the skilled person refers to as "intersymbol interference". This interference can result from the modulation law employed for transmission purposes, and it is also caused by multipath propagation in the channel.

It is found that the received signal is generally the result of a large number of reflections in the channel. The various paths taken by the transmitted signal lead to a variety of delays at the receiver. The impulse response of the channel represents all such fluctuations affecting the transmitted signal. It is therefore the fundamental characteristic representative of transmission between the transmitter and the receiver.

The impulse response of the channel is used in particular by an equalizer whose function is specifically to correct intersymbol interference at the receiver. A standard method of estimating the impulse response consists in placing a training sequence made up of known symbols in the transmitted signal. The sequence is chosen as a function of the modulation law and of the dispersion of the channel. In the present context, "dispersion" is to be understood as meaning the delay affecting a transmitted symbol taking the longest path of the channel relative to the same symbol taking the shortest path. The dispersion is routinely expressed as a multiple of the time between two successive transmitted symbols, i.e. a number of "symbol periods".

Two examples of prior art techniques for estimating the impulse response of a transmission channel will be mentioned.

The first technique uses particular training sequences referred to as constant amplitude zero autocorrelation (CAZAC) sequences. These sequences are described in an article by A. Milewski: "Periodic sequences with optimal properties for channel estimation and fast start-up equalization", IBM Journal of Research and Development, Vol.27, No.5, September 1983, pages 426–431.

The GSM cellular mobile radio system uses training sequences TS made up of 26 symbols $a_0$ to $a_{25}$ taking the value +1 or −1. These sequences have the following properties:

$$\sum_{i=5}^{20} a_i^2 = 16$$

$$\sum_{i=5}^{20} a_i a_{i+k} = 0$$

Letting d denote the dispersion of the channel, which takes the value 4 in the GSM, the estimate of the impulse response takes the form of a vector X with five components $x_0$ to $x_4$.

The received symbol sequence S corresponding to the training sequence TS is also made up of 26 symbols, denoted $s_0$ to $s_{25}$. The natural assumption is made here that the transmitter and the receiver are perfectly synchronized, in which case the estimate of the impulse response X is given by the following expression:

$$X_k = \frac{1}{16} \sum_{i=5}^{20} a_i s_{i+k}$$

The CAZAC technique has the advantage that it is very simple to implement. However, it should be noted that each component of the impulse response is established from only 16 received symbols. Because the training sequence is made up of 26 symbols and the channel dispersion value is 4, there is information in the received signal that is not taken into account and this degrades performance compared to the theoretical ideal.

The second prior art technique uses the least squares criterion. It is described in particular in patent applications FR 2 696 604 and EP 0 564 849. It uses a measurement matrix A constructed from a training sequence TS of length n. The matrix has (n−d) rows and (d+1) columns, where d again represents the dispersion of the channel. The item in the ith row and the jth column is the (d+i−j)th symbol of the training sequence:

$$A = \begin{pmatrix} a_4 & a_3 & a_2 & a_1 & a_0 \\ a_5 & a_4 & a_3 & a_2 & a_1 \\ a_6 & a_5 & a_4 & a_3 & a_2 \\ a_7 & \ldots & \ldots & \ldots & \ldots \\ \ldots & \ldots & \ldots & \ldots & \ldots \\ \ldots & \ldots & \ldots & \ldots & \ldots \\ a_{25} & \ldots & \ldots & \ldots & a_{21} \end{pmatrix}$$

The training sequence is chosen so that the matrix $A^t A$, where the operator $.^t$ represents transposition, cannot be inverted. This is inherently the case for CAZAC sequences but is also the case for other sequences.

The first four symbols $s_0$ through $s_3$ in the sequence of received symbols are ignored because they also depend on unknown symbols transmitted before the training sequence, given that the value of the channel dispersion is 4. At the risk of using a misnomer, the received signal will therefore be defined as a vector S whose components are the received symbols $s_4, s_5, s_6, \ldots, s_{25}$.

The estimate of the impulse response then takes the following form:

$$X = (A^t A)^{-1} A^t . S$$

This least squares technique is slightly more complex than the preceding technique but it should be noted that the matrix $(A^t A)^{-1} A^t$ is calculated only once. Note also that each component of the estimate of the impulse response X is obtained from 22 received symbols, rather than from only 16 as in the CAZAC technique. Improved performance can therefore be expected.

Whatever technique is used, estimation errors are inevitable, however. Determining the impulse response is a problem that cannot be solved exactly in the presence of additive noise. Also, the prior art techniques implicitly assume that the impulse response can take any form.

Accordingly, an object of the present invention is to provide a method of estimating a transmission channel which has improved resistance to additive noise, in other words which leads to an error lower than the estimation error of prior art techniques.

According to the invention, the method of estimating a transmission channel requires a signal received by the channel and corresponding to a transmitted training sequence and includes the following steps:

acquiring a statistic of the transmission channel, establishing an estimate of the impulse response of the channel weighted by said statistic of the channel by means of the received signal.

The statistic of the channel represents a value of the impulse response prior to acquisition of the received signal. Said weighting introduces the fact that the impulse response related to the received signal has a value which is probably closer to that prior value than a value very far away from it. Thus statistically, the estimation error is reduced.

The statistic advantageously corresponds to an estimate of the covariance of said impulse response.

A first variant of the method includes the following steps:

smoothing the impulse response and orthonormalizing by means of a transformation matrix W to obtain the estimate of the covariance which then takes the form of a matrix L', seeking eigenvectors $v_i'$ and eigenvalues $\lambda_i'$ associated with that matrix L', estimating the instantaneous impulse response of the channel from the received signal and applying that transformation matrix W to form a vector X', so establishing the weighted estimate Xp:

$$X_p = \sum \left( \frac{\lambda_i' - N_0}{\lambda_i'} (v_i'^h \cdot X') \right) W v_i'^h$$

where $N_0$ is a positive real number representing additive noise.

The additive noise can be made equal to the smallest of the eigenvalues $\lambda_i'$.

Each eigenvalue of a subset of said eigenvalues $\lambda_i'$ having a contribution less than a predetermined threshold can be forced to the value of said additive noise.

This reduces complexity commensurately.

In a second variant of the method, the estimate of the covariance takes the form of a matrix R and said weighted estimate is established as follows:

$$Xp = (A^t A + N_0 R^{-1})^{-1} A^t . S$$

where A is the measurement matrix associated with the training sequence and $N_0$ is a positive real number representing the additive noise.

Whatever solution is adopted, when the instantaneous impulse response X has been estimated, the additive noise is advantageously obtained in the following manner:

estimating the instantaneous noise: N=S−A.X, normalizing the energy of this estimate of the instantaneous noise.

Also, said normalization is preferably followed by an averaging step.

If the above solution is not adopted in the second variant, the method can include a step of orthonormalizing the matrix R by means of a transformation matrix W to obtain a new matrix R', the weighted estimate then taking the following new form:

$$Xp = W(I + N_0 R'^{-1})^{-1} A'^t . S$$

where the matrix A' is equal to product of the transformation matrix W and said measurement matrix A.

The expression $(I+N_0 R'^{-1})^{-1}$ is advantageously calculated by means of the matrix inversion lemma.

Figure 2:
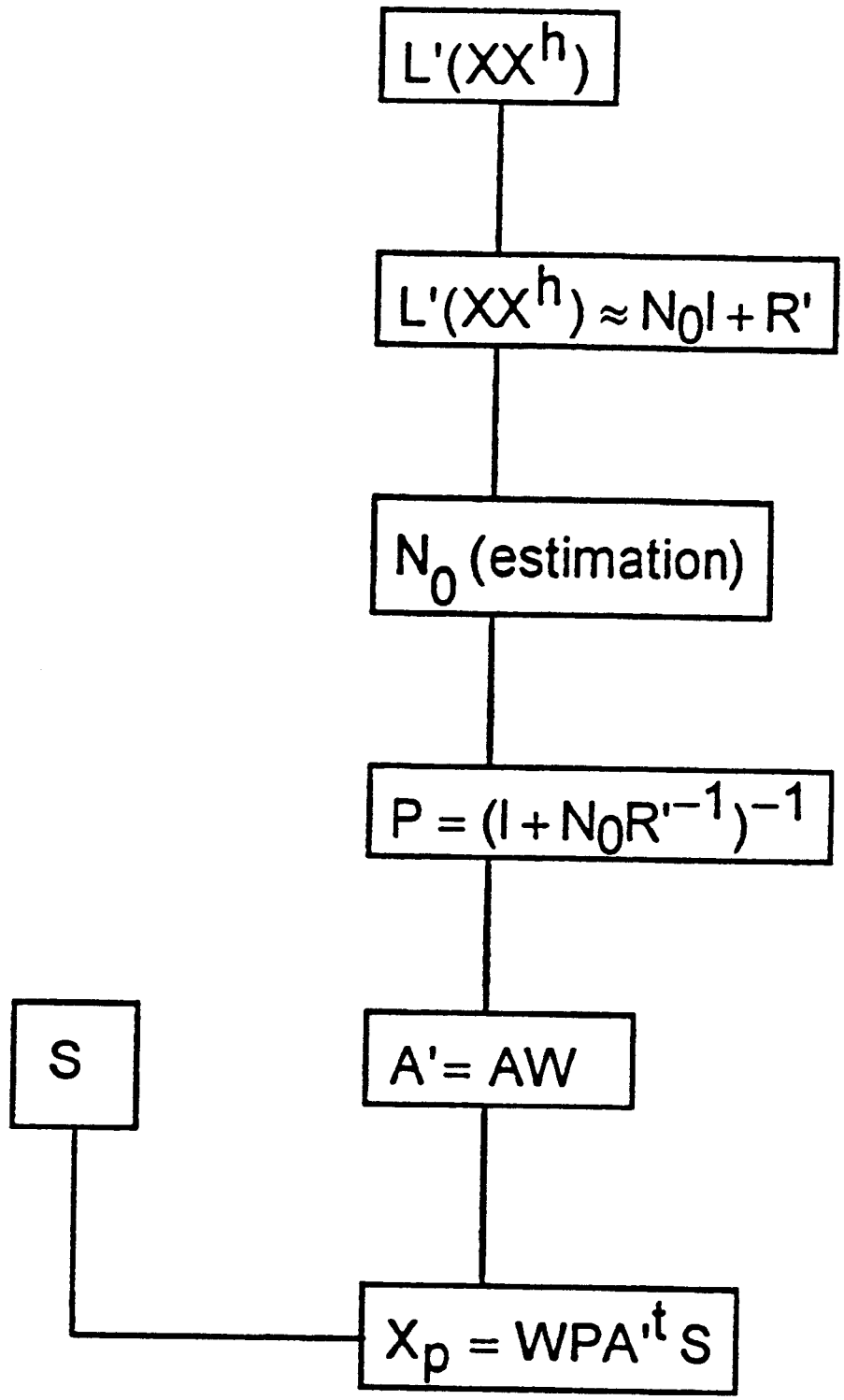

The present invention emerges in more detail from the following description of embodiments of the invention which is given by way of example only and with reference to the accompanying drawings, in which:

FIG. 1 is a diagram identifying the principal steps of a first variant of a method in accordance with the invention, FIG. 2 is a diagram identifying the principal steps of a second variant of a method in accordance with the invention.

The invention is described as applied to GSM, because GSM has the merit of being well-known to the skilled person. Thus GSM is described in the interests of clarity, but this must not be taken as limiting the invention to this system alone.

The method of estimating a transmission channel first acquires a statistic of the channel. The term "statistic" refers to a data set reflecting the behavior of the channel over an analysis period. It is therefore representative of the average behavior of the channel during the analysis period. This statistic can be established by any means and anywhere. In the usual case where the estimation method is implemented in a receiver, the statistic can be established in another equipment unit of the radio communication network. What is important is that the receiver is able to acquire this statistic.

A statistic of this kind can be obtained in the following manner, for example.

Using a method known in the art, an estimate X of the impulse response is calculated for each training sequence received during the analysis period.

If the least squares technique is adopted, the value of this estimate X is:

$$X = (A^t A)^{-1} A^t . S \qquad (1)$$

It must be remembered that the transmitter and receiver are assumed to be synchronized to within better than half a symbol, in which case the received signal is the vector S whose components are the received symbols $s_4$ to $s_{25}$ synchronous with the symbols $a_4$ to $a_{25}$ of the training sequence TS. Several solutions are available for acquiring this synchronization, if not acquired already, and two examples of these are mentioned.

The first solution consists in advancing or delaying the received signal by j symbol periods so that $s_j^t = (s_{4-j}, s_{5-j}, s_{6-j}, \ldots, s_{25-j})$, where $.^t$ represents the transposition operator.

The estimate $X_j$ is then calculated for each vector $s_j$ and the value $j_M$ for which $X_j^h . X_j$ is a maximum is adopted, where $.^h$ represents the Hermitian transposition operator. This value $j_M$ gives the expected synchronization and it is sufficient to replace the vector S in equation (1) with the vector $S_{j_M}$.

The second solution artificially increases the dispersion d of the channel by a predetermined quantity 2q. A modified measurement matrix $A_m$ can then be defined with (n−d−2q) rows and (d+2q+1) columns. Assigning n and d the respective values 26 and 4:

$$A_m = \begin{pmatrix} a_4 + 2_q & \ldots & a_4 & a_3 & a_2 & a_1 & a_0 \\ a_5 + 2_q & \ldots & a_5 & a_4 & a_3 & a_2 & a_1 \\ a_6 + 2_q & \ldots & a_6 & a_5 & a_4 & a_3 & a_2 \\ a_7 + 2_q & \ldots & & & & & \\ \ldots & & & & & & \\ \ldots & & & & & & \\ a_{25} & & \ldots & \ldots & \ldots & a_{21} - 2_q \end{pmatrix}$$

It is then necessary to reduce the number of components of the received signal S by the same quantity 2q and by convention the modified vector $S_m$ is retained:

$$S_m^t = (s'_{4+q}, s'_{5+q}, \ldots, s'_{25-q})$$

A modified estimate $X_m$ is therefore obtained:

$$X_m = (A_m^t A_m) A_m^t \cdot S_m$$

The modified estimate $X_m$ has d+2q+1 components:

$$X_m^t = (x_{-q}, \ldots, x_0, x_1, \ldots, x_4, \ldots, x_{4+q})$$

With the operator .* representing the complex conjugate, the value $j_M$ of j between −q and +q which maximizes the following expression:

$$\sum_{k=0}^{4} x_{j+k}^* x_{j+k}$$

is then looked for.

The value $j_M$ determines the estimate X of the impulse response for a dispersion d=4:

$$X^t = (x_{jM}, x_{jM+1}, \ldots, x_{jM+4})$$

The synchronization is deduced immediately by applying the offset $j_M$ to the received signal S.

Equation (1) can then be applied again.

A smoothing matrix L is then constructed by smoothing the various estimates X obtained during the analysis period to obtain an estimate of the covariance associated with that impulse response. Here "smoothing" is to be understood in a very general sense, meaning any operation for smoothing or averaging the impulse response over the analysis period. This yields a statistical representation of the behavior of the transmission channel.

A first example of smoothing consists in averaging the matrix $XX^h$ over the analysis period, which is assumed to include m training sequences:

$$L(XX^h) = \frac{1}{m} \sum_{1}^{m} XX^h$$

A second example of smoothing consists in, from the ith training sequence received, updating the smoothing matrix obtained for the (i−1)th training sequence using a multiplier coefficient α generally referred to as the smoothing forgetting factor and having a value from 0 to 1:

$$L_i(XX^h) = \alpha X_i X_i^h + (1-\alpha) L_{i-1}(XX^h)$$

Initialization can be effected by any means, in particular using the first estimate X obtained or an average obtained as above for a low number of training sequences.

For simplicity, the smoothing matrix $L(XX^h)$ is denoted L.

It is assumed here that the smoothing matrix can be approximated by the following equation:

$$L \approx (A^t A)^{-1} N_0 + R \quad (2)$$

in which $N_0$ represents the noise present in the transmission channel or additive noise and R is a matrix that is usually referred to as the a priori statistical matrix of the channel because it represents the behavior of the channel ignoring noise.

It is also assumed that the measurement matrix A is properly conditioned, i.e. that the eigenvalues of the matrix $A^t A$ are very close to each other. In this case, it is beneficial to normalize the vectors consisting of the measurement matrix A, but this must not be seen as limiting the invention.

For this purpose, a transformation matrix W is used such that:

$$A' = AW \text{ and } A'^t A' = I$$

where I represents the identity matrix.

Letting L' denote the matrix so defined:

$$L = WL'W^t,$$

it is found that equation (2) can now be written:

$$L' \approx N_0 I + R' \quad (3)$$

Note that in a first variant of the channel estimation method shown in FIG. 1 the eigenvectors $v_i'$ of L' and $v_i$ of R' are identical whereas the eigenvalues $\lambda_i'$ of L' and $\lambda_i$ of R' are offset by $N_0$. Taking the same value of 4 for the dispersion of the channel, for any i from 0 to 4:

$$V_i' = V_i$$

$$\lambda_i' = \lambda_i + N_0$$

It is therefore apparent that the eigenvectors and the eigenvalues of R' and L can be determined in exactly the same way, provided that $N_0$ is known.

The step of estimating the noise is described further down to clarify the explanation, even though it precedes the step explained next.

The method according to the invention therefore includes a step of seeking eigenvalue/eigenvector pairs for the matrix L' or R'. This step is not described in detail because it is well known to the skilled person. Moreover, it goes without saying that eigenvalues whose contribution is deemed to be insignificant can be eliminated. For example, if the eigenvalues are listed in decreasing order, the lowest values whose sum is below some predetermined threshold can be eliminated.

The next step is to estimate the instantaneous impulse response X from the received signal corresponding to the last training sequence received and using any technique known in the art. Using the notation X=WX', the latter estimate is weighted by the following method to obtain a temporal weighting $X_p$ of the instantaneous impulse response:

$$X_p = \sum_{i=0}^{4} \left( \frac{\lambda_i}{\lambda_i + N_0} (v_i^h X') \right) W v_i$$

-continued $$X_p = \sum_{i=0}^{4} \left( \frac{\lambda'_i - N_0}{\lambda'_i} (v_i^h X') \right) W v_i$$

To obtain the weighting $X_p$ it is therefore necessary to estimate the additive noise $N_0$.

A first solution is to assign $N_0$ a predetermined value which reflects a threshold below which it is improbable that the additive noise can fall. That value could be determined by measuring a signal-to-noise ratio or from the performance of the receiver, for example.

A second solution is to consider that the last eigenvalue (the lowest one) of the smoothing matrix L is equal to $N_0$:

$$\lambda_4' = N_0 \text{ or } \lambda_4 = 0.$$

A third solution, and undoubtedly that offering the best performance, consists in estimating the additive noise directly from the received signal S and the measurement matrix A. This is because, if N denotes the noise vector affecting the received signal, then:

$$S = AX + N$$

Given that the vectors S and N have 22 components, $$N_0 = \left( \frac{1}{22} \right) (S - AX)^h (S - AX)$$

This estimate of the additive noise $N_0$ can naturally be averaged or smoothed.

The weighting Xp of the estimate of the instantaneous impulse response can then be done as mentioned above.

In a second variant of the channel estimation method, shown in FIG. 2, the weighted estimate Xp is established directly as:

$$Xp = (A^t A + N_0 R'^{-1})^{-1} A^t \cdot S$$

Or, using the transformation matrix W defined above:

$$Xp = W(I + N_0 R'^{-1})^{-1} W^t A^t \cdot S \quad (4)$$

From equation (3):

$$R' = L' = N_0 I$$

Again the additive noise $N_0$ must be estimated, and this can be done using any of the above three solutions for the first variant of the channel estimation method.

An advantageous solution to obtaining the temporal weighting Xp is to use the following method.

The matrix R' is divided by $N_0$:

$$B = \frac{R'}{N_0}$$

It follows that:

$$I + N_0 R'^{-1} = I + B^{-1}$$

The matrix inverting lemma is used to calculate the weighting matrix $P = (I + B^{-1})^{-1}$.

Accordingly, denoting the canonic vectors $e_i$, the following iteration is performed:

initialization:

$$P = B$$

for i varying from 0 to d (4 in this instance):

$$P = P - \frac{Pe_i(Pe_i)^h}{1 + e_i^h Pe_i}$$

Because P is known, all that remains is to establish the weighting Xp from equation (4).

Note that the weighting matrix P is not necessarily calculated as each new training sequence is transmitted. It can be calculated at a slower rate because it varies at substantially the same rate as R' and thus more slowly than the received signal S.

Note also that the weighted estimate is obtained without recourse to the instantaneous impulse response. It is produced directly from the received signal S.

What is claimed is:

1. A method of estimating a transmission channel from a signal (S) received by that channel and corresponding to a transmitted training sequence, comprising the steps of:

acquiring a statistic of the transmission channel, said statistic corresponding to an estimate of the covariance of a previous impulse response, establishing an estimate (Xp) of an instantaneous impulse response of said channel weighted by said statistic of the channel by means of said received signal (S), by the steps of:

smoothing said impulse response and orthonormalizing by means of a transformation matrix W to obtain said estimate of the covariance which then takes the form of a matrix L', seeking eigenvectors ($v_1'$) and eigenvalues ($\lambda_i'$) associated with that matrix L', estimating the instantaneous impulse response of the channel from said received signal (S) and applying that transformation matrix W to form a vector X', so establishing said weighted estimate (Xp):

$$X_p = \sum \left( \frac{\lambda'_i - N_0}{\lambda'_i} (v_i'^h \cdot X') \right) W v_i^h$$

where $N_0$ is a positive real number representing an additive noise.

2. A method according to claim 1, wherein said additive noise ($N_0$) is made equal to the smallest of said eigenvalues ($\lambda_1'$).

3. A method according to claim 1, wherein each eigenvalue of a subset of said eigenvalues ($\lambda_i'$) having a contribution less than a predetermined threshold is forced to the value of said additive noise ($N_0$).

4. A method of estimating a transmission channel from a signal (S) received by that channel and corresponding to a transmitted training sequence, comprising the steps of:

acquiring a statistic of the transmission channel, said statistic corresponding to an estimate of the covariance of a previous impulse response, establishing an estimate (Xp) of an instantaneous impulse response of said channel weighted by said statistic of the channel by means of said received signal (S), wherein said estimate of the covariance takes the form of a matrix R and said weighted estimate (Xp) is established as follows:

$$Xp = (A^t A + N_0 R^{-1})^{-1} A^t \cdot S$$

where A is the measurement matrix associated with said training sequence and $N_0$ is a positive real number representing the additive noise.

5. A method according to claim 4, comprising a step of orthonormalizing said matrix R by means of a transformation matrix W to obtain a new matrix R', the weighted estimate then taking the following new form:

$$Xp = W^t(I+N_0 R'^{-1})^{-1} W^t A'^t . S$$

where the matrix A' is equal to a product of the transformation matrix W with said measurement matrix A and I is the identity matrix.

6. A method according to claim 5, wherein the expression $(I+N_0 R'^{-1})^{-1}$ is calculated by means of the matrix inversion lemma.

7. A method according to claim 4, wherein after estimation of the instantaneous impulse response (Xp), said additive noise is obtained in the following manner:
  estimating the instantaneous noise: N=S−A.X,
  normalizing the energy of this estimate of the instantaneous noise.

8. A method according to claim 7, wherein said normalization is followed by an averaging step.

* * * * *